United States Patent [19]
Al Ghatta et al.

[11] Patent Number: 6,057,016
[45] Date of Patent: May 2, 2000

[54] POLYESTER RESINS WITH IMPROVED PROPERTIES

[75] Inventors: Hussein Al Ghatta, Fiuggi; Antonio Pinto, Anzio, both of Italy

[73] Assignee: Sinco Ricerche S.p.A., Verbania Pallanza, Italy

[21] Appl. No.: 09/270,198

[22] Filed: Mar. 15, 1999

[30] Foreign Application Priority Data

Mar. 17, 1998 [IT] Italy .................................. MI98A0537

[51] Int. Cl.[7] ................................ B29D 22/00; C08J 5/49
[52] U.S. Cl. ........................ 428/35.7; 528/296; 528/302; 528/308; 528/308.6; 524/115; 524/127; 524/128; 524/221; 428/36.92

[58] Field of Search ...................................... 528/296, 302, 528/308, 308.6; 524/115, 128, 127, 221; 428/35.7, 36.92

[56] References Cited

FOREIGN PATENT DOCUMENTS 0041035  12/1981  European Pat. Off. .

*Primary Examiner*—Samuel A. Acquah
*Attorney, Agent, or Firm*—Guido Modiano; Albert Josif; Daniel O'Byrne

[57] ABSTRACT

Polyester resins with a low formaldehyde content, to which an antioxidant acting as free-radical scavenger is added, containing less than 150 ppb of formaldehyde and having a formaldehyde generation rate of less than 15 ppb/min at 290° C.

11 Claims, No Drawings

POLYESTER RESINS WITH IMPROVED PROPERTIES

The present invention relates to a method for preparing polyester resins with low content of residual formaldehyde and a low formaldehyde generation rate, to the resulting resins and to the articles manufactured with said resins.

BACKGROUND OF THE INVENTION

Formaldehyde and other contaminants, mainly acetaldehyde, are generated in considerable amounts during resin treatment steps such as blow-extrusion and blow-injection.

The residual formaldehyde content of the products can exceed 1000 ppb and the formaldehyde generation rate, measured at 290° C., can be higher than 500 ppb/minute.

The presence of formaldehyde in drinks and/or food, like the presence of other contaminants, negatively affects their organoleptic properties, specifically their taste.

Accordingly, it is desirable to have the lowest possible formaldehyde content in the resin that makes contact with food or beverages.

It is also desirable for articles which do not make contact with food or beverages also to have a low residual formaldehyde content.

In order to obtain articles having a low residual formaldehyde content, the initial resin must be characterized not only by a low aldehyde content but also by a low rate of aldehyde generation at the process temperatures used to prepare the articles.

Methods are known for obtaining polyester resins with a low acetaldehyde content and with a low acetaldehyde regeneration rate (EP-B-41035).

The polyester resins meant for blow-extrusion, blow-injection or other processes have intrinsic viscosities usually above 0.75 dl/g. These values are obtained by subjecting the resin, after its polycondensation reaction (in which the intrinsic viscosity generally does not reach values higher than 0.6–0.7 dl/g) to solid-state polycondensation (SSP).

The SSP reaction is performed by heating the pellets of the resin, after its crystallization, to a temperature from about 180° to 230° C. for a time sufficient to obtain the intended IV value.

The process is performed in a stream of inert gas (nitrogen or other gases).

Extrusion of the resin to obtain the pellets to be subjected to SSP is generally performed in air. Resin processing to obtain the various articles is also performed in air.

SUMMARY OF THE INVENTION

It has now been unexpectedly found that it is possible to obtain polyester resins with a low formaldehyde content (less than 150 ppb) and with a low formaldehyde generation rate, lower than 15 ppb/minute at 290° C., by addition to a polyester resin of antioxidants capable of removing free radicals (free-radical scavengers).

DETAILED DESCRIPTION OF THE DRAWINGS

When the resin is regraded in the solid state, in addition to containing the antioxidant which acts as free-radical scavenger, said resin must be heated in an inert-gas atmosphere.

The behavior of the polyester resins added with antioxidants acting as free-radical scavengers is unusual with respect to the formation of formaldehyde if one considers that by working under the same conditions it is not possible to limit neither the acetaldehyde content nor its generation rate.

Free-radical scavenging antioxidants are added to the polyester resin during the preparation of said resin in the esterification or transesterification step or in the subsequent step of polycondensation in the melt.

Said antioxidants can also be added to the resin in the melt by mixing in an extruder before forming the articles or before subjecting the resin to the SSP step.

The treatment of the resin in the melted state can be performed in an inert-gas atmosphere (nitrogen), for example by passing a stream of inert gas flow in the environment in which preparation of the articles occurs. It is also possible to work in air, but less satisfactory results are obtained.

The antioxidants are used in an amount from 0.1 to 1% by weight on the resin.

It has been found, and it is a further aspect of the invention, that it is possible to avoid coloring problems due to the presence of the antioxidant, particularly if the antioxidant is of the phosphite class, which occur when the resin is subjected to SSP at a temperature above 180° C., if the resin, which contains the antioxidant, is added with a dianhydride of a tetracarboxylic aromatic acid and is subjected to SSP at temperatures lower than 180° C.

Pyromellitic dianhydride is the preferred compound.

Copolyethylene terephthalate resins containing up to 15% isophthalic acid, with the addition of less than 0.2% pyromellitic dianhydride by weight, are particularly suitable for this purpose.

When working at temperatures lower than 180° C., for example between 170° and 180° C., the kinetics of the polycondensation reaction is still sufficiently high. The resulting polymer is colorless (yellow index of less than 4 measured according to ASTM D 542-50).

As already indicated, the antioxidants capable of acting as free-radical scavengers are usable in the process according to the present invention.

This category includes phosphites having the formula $P(OR^1)_3$, where the radicals $R^1$ are mutually identical or different and are alkyl or aryl groups, such as for example alkyl radicals with 8 or more carbon atoms, such as isooctyl, isodecyl, octadecyl, or aryl radicals such as phenyl and phenyl substituted with one or more alkyl groups, such as t.butyl-phenyl, di-t.butyl-phenyl, n-nonyl-phenyl and the like.

It is also possible to use phosphates having the formula $OP(OR^1)_3$, where $R^1$ has the above mentioned meaning.

Triarylphosphates are preferred.

Diphosphite compounds such as the compound marketed by General Electric Specialty Chemicals under the name "Ultranox 626" or "Ultranox 627" are particularly suitable thanks to the low yellow index of resins stabilized with these antioxidants.

Examples of triphosphites are triphenylphosphite and trioctadecylphosphite.

Other antioxidants which can be used are phenolic antioxidants, such as hindered phenolic compounds, for example the compound "Irganox 1010" by Ciba-Geigy, constituted by tetrakis (methylene-3.5-di-t.butyl-4-hydroxy idro-cinnamate).

The polyester resins that can be used in the process according to the invention are constituted by the product of the polycondensation of an aromatic dicarboxylic acid, such as for example terephthalic acid, with a diol with 2–12 carbon atoms, such as for example ethylene glycol, 1,4-butane diol and 1,4 cyclohexane dimethylol.

The preferred resins are constituted by polyethylene terephthalate, polybutylene terephthalate, and terephthalate copolymers in which up to 15% in mols of the units derived from the terephthalic acid are substituted with units derived from isophthalic acid or naphthalene dicarboxylic acid.

Resins with a low formaldehyde content and low formaldehyde generation rate have an intrinsic viscosity of more than 0.4 dl/g. Those with an intrinsic viscosity of more than 0.7 dl/g obtained by regrading in the solid state are particularly suitable for preparing containers for carbonated beverages, films, foamed materials for use, for example, for preparing trays for food and for any other application which requires a low formaldehyde content and a low formaldehyde generation rate.

The following examples are given by way of nonlimitative illustration of the invention.

Analytical Methods

Formaldehyde determination is performed by HPLC (High-Pressure Liquid Chromatography), using dinitrophenylhydrazine (DNPH) as detection agent. The sample, placed in a flask adapted for gas flushing and equipped with a filtering disk, is desorbed at 150° C. for 6 hours in a 10 ml/min nitrogen flow.

The compounds with carbonyl groups removed in this manner are fixed on highly pure silica coated with DNDH (a product marketed by Supelco, cat. no. 2-1026), where they are converted into the hydrazone derivatives.

The hydrazone derivatives are eluted by a cartridge with acetonitrile and water and analyzed by HPLC according to the following procedure.

| | |
|---|---|
| Flow rate | 1 ml/min |
| Injected volume | 20 ml |
| Detection | UV, 360 nm |
| Column characteristic | C 18 4.6 mm × 250 mm I.D. |

Intrinsic viscosity is determined on a solution of 0.5 g of polymer in 100 ml of a mixture 60/40 by weight of phenol/tetrachloroethane at 25° C.

EXAMPLES

1. Production of Dumbbells

The resin used is a polyethylene terephthalate (TPA) obtained from terephthalic acid by using an antimony catalyst (Sb triacetate) and a TPA copolymer with 5% isophthalic acid (IPA). The resin, dried beforehand, is obtained with the addition, in a screw extruder (Haake), of the antioxidants and of the pyromellitic anhydride (when used). The initial viscosity of the polymer was 0.579 dl/g; final viscosity ranges between 0.572 and 0.579 dl/g (see table).

The polymer thus produced is subjected to solid-state polycondensation in a 5.5-1 bench reactor, heated with an oil jacket and a stream of hot nitrogen, capable of maintaining the chips at a constant temperature of 196° C. (examples 1, 2, 3) and 171° C. (example 4). At the end of the polycondensation, the polymers had an intrinsic viscosity between 0.746 and 0.790 dl/g (see table).

These polymers, after being dried at 140° C., were used to prepare dumbbell specimens in a nitrogen-air atmosphere, by using a machine with an injection press (Arburg) at 300° C.

The results are summarized in Table 1.

2. Production of Preforms

Starting from the same commercial polymer previously described, preforms were produced both with the polymers to which the antioxidants were added, as previously mentioned, and by adding the antioxidants directly in the mixer between the dryer and the extruder of the mold for the preforms (examples 5–6). The polymer had an initial viscosity of 0.762 dl/g and had been dried to 140° C.

The results are listed in Table 1.

Table 1 also reports the data related to the polymer without the addition of the antioxidants.

Results similar to those listed in the table are achieved by using resins prepared by using titanium catalysts (titanium dioxide-silica: AK20 C94).

The disclosures in Italian Patent Application No. MI98A000537 from which this application claims priority are incorporated herein by reference.

TABLE 1

| | Comp. Ex. | Example 1 | Example 2 | Example 3 | Example 4 | Example 5 | Example 6 |
|---|---|---|---|---|---|---|---|
| Polymers TPA | x | x | x | x | x | x | x |
| Copolymer TPA + 4.5% IPA | | | | | x | | |
| Ultranox 627 A | | 0.5% | | | 0.5% | 0.5% | |
| Etanox 330 | | | 0.5% | | | | |
| ADK PEP 36 | | | | 0.5% | | | 0.5% |
| PMDA | | | | | 0.2% | | |
| Amorphous chips | x | x | x | x | | | |
| IV dl/gr | 0.578 | 0.552 | 0.538 | 0.579 | | | |
| Formaldehyde free ppt generation | | | | | | | |
| 1 min. | 42 | 1 | 5 | 2 | | | |
| 5 min. | 371 | 28 | 26 | 30 | | | |
| 10 min. | 2128 | 116 | 71 | 119 | | | |
| Regraded chips | x | x | x[1] | x | x[1] | x | x |
| IV dl/gr | 0.746 | 0.751 | 0.757 | 0.790 | 0.790 | 0.790 | 0.790 |
| Formaldehyde free ppt generation | | | | | | | |
| 1 min. | 64 | n.d. | 8 | n.d. | n.d. | | |
| 5 min. | 476 | 25 | 37 | 19 | n.d. | | |
| 10 min. | 3426 | 58 | 64 | 41 | 41 | | |
| Dumbbell | x | x | x[2] | x | x[2] | | |
| Formaldehyde free ppt | | | | | | | |
| air | 1740 | 38 | 68 | 47 | 3 | | |
| nitrogen | 350 | 34 | 50 | 37 | n.d. | | |
| Preforms | x | x | x[2] | x | x[2] | x | x |
| Formaldehyde free ppt | | | | | | | |
| air | 962 | 20 | 40 | 22 | n.d. | 75 | 41 |
| nitrogen | 541 | 18 | 25 | 16 | n.d. | 46 | 36 |

ULTRANOX 627 A: Bis(2,4-di-t-butylphenil)pentaerythritol disphosphite
ETANOX 330: 1,3,5,-Trimethyl-2,4,6-tris(3,5-di-tert-butyl-4-hydroxybenzyl)benzene
ADK STAB PEP-36: Bis(2,6-di-tert-butyl-4-methylphenyl)pentacrythritol-di-phosphite
[1]product of good colour
[2]transparent product of good colour

What is claimed is:

1. Aromatic polyester resins containing a free-radical scavenger antioxidant, characterized by a residual formaldehyde content of less than 150 ppb and by a formaldehyde generation rate at 290° C. of less than 15 ppb/minute.

2. Resins according to claim 1, having an intrinsic viscosity of more than 0.7 dl/g.

3. Resins according to claim 1, chosen from the group consisting of polyethylene terephthalate, polybutylene terephthalate, copolyethylene terephthalate, containing up to 15% by weight of isophthalic acid units.

4. Resins according to claim 1, constituted by copolyethylene terephthalate containing up to 15% by weight isophthalic acid added with less than 0.2% pyromellitic dianhydride.

5. Articles obtained from the resins of claim 1.

6. Preforms for beverage bottles obtained from the resins of claim 1.

7. A method for preparing the resin according to claim 1, wherein an antioxidant which has a free-radical scavenging action is added to the resin in molten state and the resin is then subjected to a solid-state polycondensation reaction in an inert-gas atmosphere.

8. A method according to claim 7, wherein a dianhydride of an aromatic tetracarboxylic acid is added to the resin and the solid-state polycondensation reaction is performed at temperatures from 170° to 180° C.

9. Colorless resins obtained according to the method of claim 8.

10. Resins and articles according to claim 1, containing an antioxidant selected from the group consisting of phosphites, organic phosphates, and hindered phenols.

11. Resins according to claim 10, wherein the antioxidant is added to the resin in an amount from 0.1 to 1% by weight.

* * * * *